(12) United States Patent
Kin

(10) Patent No.: US 10,739,869 B1
(45) Date of Patent: Aug. 11, 2020

(54) APPARATUS, SYSTEM, AND METHOD FOR CONTROLLING ARTIFICIAL-REALITY ENVIRONMENTS

(71) Applicant: Facebook Technologies, LLC, Menlo Park, CA (US)

(72) Inventor: Kenrick Cheng-Kuo Kin, Vancouver, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 0 days.

(21) Appl. No.: 15/968,211

(22) Filed: May 1, 2018

(51) Int. Cl.
| | |
|---|---|
| *G06F 3/0487* | (2013.01) |
| *G06F 3/0346* | (2013.01) |
| *G06F 3/01* | (2006.01) |
| *G06F 3/0362* | (2013.01) |
| *G06T 19/00* | (2011.01) |
| *G02B 27/01* | (2006.01) |
| *G06F 3/0484* | (2013.01) |
| *G06F 3/0481* | (2013.01) |
| *G06F 3/0482* | (2013.01) |

(52) U.S. Cl.
CPC ....... *G06F 3/0346* (2013.01); *G02B 27/0172* (2013.01); *G06F 3/012* (2013.01); *G06F 3/013* (2013.01); *G06F 3/014* (2013.01); *G06F 3/0362* (2013.01); *G06T 19/006* (2013.01); *G06F 3/0482* (2013.01); *G06F 3/04815* (2013.01); *G06F 3/04842* (2013.01)

(58) Field of Classification Search
CPC .................................................. G02B 27/0172
See application file for complete search history.

(56) References Cited

U.S. PATENT DOCUMENTS

2017/0097753 A1* 4/2017 Bailey ................ G02B 27/0172

* cited by examiner

*Primary Examiner* — Abdul-Samad A Adediran
(74) *Attorney, Agent, or Firm* — FisherBroyles, LLP

(57) ABSTRACT

An artificial-reality apparatus may include a wearable band dimensioned to be worn around a portion of a user's hand. The artificial-reality apparatus may also include a primary tactile-input location at an outer surface of the wearable band to facilitate inspecting an artificial-reality element when another hand of the user activates the primary tactile-input location. Additionally, the artificial-reality apparatus may include a secondary tactile-input location at the outer surface of the wearable band to facilitate manipulating the artificial-reality element when the user's other hand simultaneously activates the primary tactile-input location and the secondary tactile-input location. Furthermore, the artificial-reality apparatus may include a computing subsystem contained by the wearable band that communicatively couples the primary tactile-input location and the secondary tactile-input location to an artificial-reality system. Various other apparatuses, systems, and methods are also disclosed.

20 Claims, 9 Drawing Sheets

APPARATUS, SYSTEM, AND METHOD FOR CONTROLLING ARTIFICIAL-REALITY ENVIRONMENTS

BACKGROUND

Artificial-reality systems, such as virtual-reality and augmented-reality systems, have risen as ways to present digital content to users in immersive, three-dimensional environments. For example, users may utilize virtual-reality headsets to experience remote locations without ever leaving their homes. Augmented-reality systems may also provide users with digital content that is merged with the actual environments around the users. These types of technology may enhance users' experiences by increasing and streamlining the information that the users can process. Such technology may also provide users with the ability to navigate and alter digital content within various environments.

However, traditional artificial-reality systems may be difficult or unintuitive for users to operate. For example, virtual-reality headsets may not provide accurate tracking of a user's movements and may not control a virtual environment with a high degree of precision. Additionally, some devices may be unwieldy or difficult to physically handle. Thus, users may not be able to easily explore virtual environments. Furthermore, some artificial-reality systems may not provide users with enough feedback about the virtual environments and/or the users' interactions with the environments, which may create difficulties in real-time manipulation of environments. Therefore, better methods for controlling artificial-reality environments are needed to improve user experiences with artificial-reality environments.

SUMMARY

As will be described in greater detail below, the instant disclosure describes various apparatuses, systems, and methods for controlling artificial-reality environments by detecting and responding to a user's handling of a wearable artificial-reality apparatus. In one example, an artificial-reality apparatus may include a wearable band dimensioned to be worn around a portion of a user's hand. In this example, the artificial-reality apparatus may also include a primary tactile-input location at an outer surface of the wearable band to facilitate inspecting an artificial-reality element when another hand of the user activates the primary tactile-input location. Additionally, the artificial-reality apparatus may include a secondary tactile-input location at the outer surface of the wearable band to facilitate manipulating the artificial-reality element when the user's other hand simultaneously activates the primary tactile-input location and the secondary tactile-input location. Furthermore, the artificial-reality apparatus may include a computing subsystem contained by the wearable band that communicatively couples the primary tactile-input location and the secondary tactile-input location to an artificial-reality system.

In some embodiments, the wearable band may be dimensioned to be worn around a wrist of the user's hand. Additionally or alternatively, the wearable band may be dimensioned to be worn around a finger of the user's hand.

In some examples, the primary tactile-input location may include a primary tactile sensor activated by a touch from the user's other hand. Additionally or alternatively, the primary tactile-input location may include a primary tactile switch activated by a depression of the primary tactile switch by the user's other hand.

In one embodiment, the primary tactile-input location may facilitate inspecting the artificial-reality element by manipulating a cursor in the artificial-reality system, selecting the artificial-reality element in the artificial-reality system, and/or inspecting a menu about the artificial-reality element. In this embodiment, the cursor in the artificial-reality system may be positioned based on a position of the wearable band, an eye gaze of the user, and/or a position of a head of the user.

In some examples, the secondary tactile-input location may include a secondary tactile sensor activated by a touch from the user's other hand. Additionally or alternatively, the secondary tactile-input location may include a secondary tactile switch activated by a depression of the secondary tactile switch by the user's other hand.

In one embodiment, the secondary tactile-input location may facilitate manipulating the artificial-reality element by selecting the artificial-reality element in the artificial-reality system, inspecting a menu about the artificial-reality element, moving the artificial-reality element within an artificial-reality environment, and/or adjusting a property of the artificial-reality element. In this embodiment, the secondary tactile-input location may facilitate moving the artificial-reality element based on a position of the wearable band, an eye gaze of the user, and/or a position of a head of the user.

In one example, the computing subsystem may couple the primary tactile-input location and the secondary tactile-input location to the artificial-reality system by a wired connection. Additionally or alternatively, the computing subsystem may couple the primary tactile-input location and the secondary tactile-input location to the artificial-reality system by a wireless connection.

According to various embodiments, a corresponding artificial-reality system may include an artificial-reality headset dimensioned to be worn on a user's head, wherein the artificial-reality headset outputs a feedback about an artificial-reality environment to the user. The artificial-reality system may also include an artificial-reality apparatus dimensioned to be worn around a portion of a hand of the user. In these embodiments, the artificial-reality apparatus may include a primary tactile-input location at an outer surface of the artificial-reality apparatus to facilitate inspecting an artificial-reality element when another hand of the user activates the primary tactile-input location and a secondary tactile-input location at the outer surface of the artificial-reality apparatus to facilitate manipulating the artificial-reality element when the user's other hand simultaneously activates the primary tactile-input location and the secondary tactile-input location. Additionally, the artificial-reality system may include a computing subsystem that communicatively couples the artificial-reality apparatus to the artificial-reality headset.

In some examples, the artificial-reality headset may output a feedback about visual information about the artificial-reality environment. Additionally or alternatively, the artificial-reality headset may output a feedback about audio information about the artificial-reality environment.

In some embodiments, the artificial-reality apparatus may be dimensioned to be worn around a wrist of the user's hand. Additionally or alternatively, the artificial-reality apparatus may be dimensioned to be worn around a finger of the user's hand.

In one example, the primary tactile-input location of the artificial-reality system may facilitate inspecting the artificial-reality element by manipulating a cursor in the artificial-reality environment, selecting the artificial-reality element in the artificial-reality environment, and/or inspecting a menu about the artificial-reality element. In this example, the cursor in the artificial-reality environment may be positioned based on a position of the artificial-reality apparatus, an eye gaze of the user, and/or a position of the artificial-reality headset.

In one embodiment, the secondary tactile-input location of the artificial-reality system may facilitate manipulating the artificial-reality element by selecting the artificial-reality element in the artificial-reality environment, inspecting a menu about the artificial-reality element, moving the artificial-reality element within the artificial-reality environment, and/or adjusting a property of the artificial-reality element. In this embodiment, the secondary tactile-input location may facilitate moving the artificial-reality element based on a position of the artificial-reality apparatus, an eye gaze of the user, and/or a position of the artificial-reality headset.

In some examples, the computing subsystem may couple the artificial-reality apparatus to the artificial-reality headset by a wired connection. Additionally or alternatively, the computing subsystem may couple the artificial-reality apparatus to the artificial-reality headset by a wireless connection.

In addition to the various systems and apparatuses described herein, the instant disclosure presents exemplary methods for controlling artificial-reality environments. For example, a corresponding method may include detecting, by a computing subsystem, a change in a state of a primary tactile-input location at an outer surface of an artificial-reality apparatus worn around a portion of a user's hand and/or a state of a secondary tactile-input location at the outer surface of the artificial-reality apparatus worn around the portion of the user's hand. The method may also include manipulating an artificial-reality element in an artificial-reality environment based on the detected change. Additionally, the method may include adjusting a feedback about the artificial-reality element that is output from an artificial-reality headset worn on a head of the user.

In some embodiments, manipulating the artificial-reality element in the artificial-reality environment may include selecting the artificial-reality element in the artificial-reality environment. Additionally or alternatively, manipulating the artificial-reality element may include moving the artificial-reality element within the artificial-reality environment and/or adjusting a property of the artificial-reality element.

In some examples, adjusting the feedback about the artificial-reality element may include presenting information about the artificial-reality element based on the state of the primary tactile-input location. Additionally or alternatively, adjusting the feedback may include adjusting visual information about the artificial-reality environment based on a change in the artificial-reality element and/or adjusting audio information about the artificial-reality environment based on a change in the artificial-reality element.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
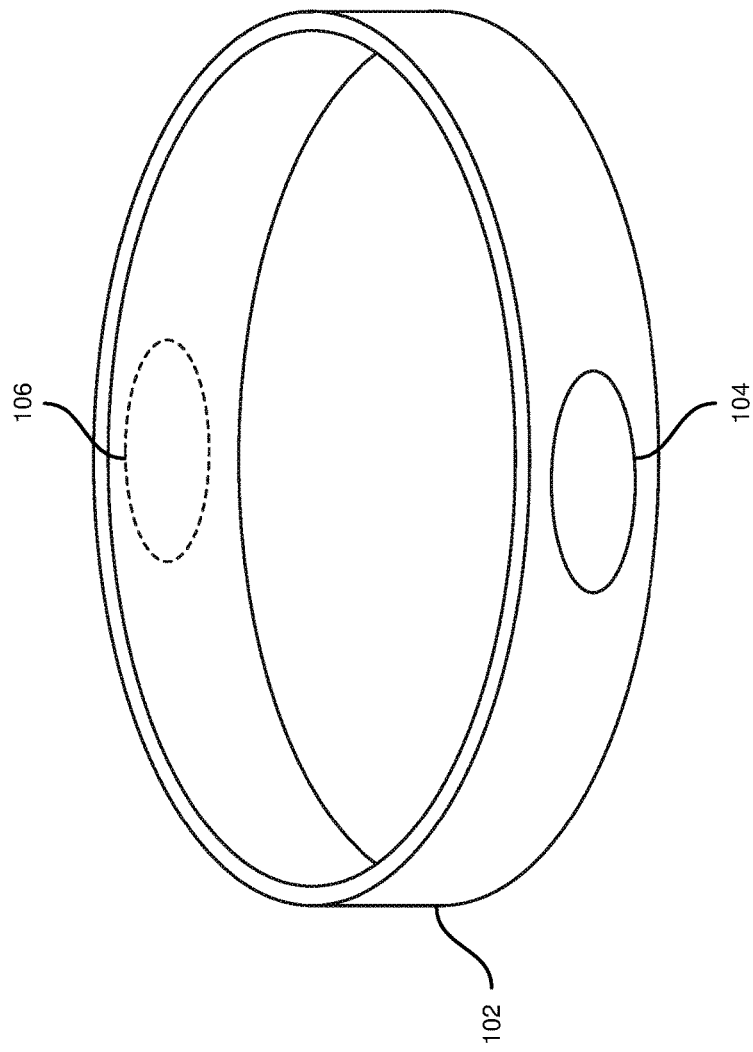
FIG. 1 is a perspective view of an exemplary artificial-reality apparatus according to some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes and illustrates various apparatuses, systems, and methods for controlling artificial-reality environments. As will be explained in greater detail below, embodiments of the instant disclosure may, using a wearable apparatus, permit a user to control artificial-reality elements within an artificial-reality environment. For example, a user may activate a button and/or a sensor on the wearable apparatus to examine and/or interact with an object in a virtual-reality environment. Additionally, the wearable apparatus may include a computing subsystem that interfaces with other components of the wearable apparatus and/or with a separate device, such as a virtual-reality headset, to provide feedback about the artificial-reality environment to the user. In some instances, the wearable apparatus itself may be a head-mounted-display device or may be included in a head-mounted-display device, such as a virtual-reality headset. By adjusting the feedback based on commands to manipulate the artificial-reality environment, the disclosed systems may update changes to the artificial-reality environment in real time as the user controls elements of the environment.

The following will provide, with reference to FIGS. 1-4, detailed descriptions of an artificial-reality apparatus dimensioned to be worn by a user. In addition, the discussion associated with FIGS. 5-8 will provide examples of a user activating the artificial-reality apparatus to control an artificial-reality environment of an artificial-reality system. Furthermore, detailed descriptions of methods for controlling artificial-reality environments will be provided in connection with FIG. 9.

FIG. 1 illustrates a perspective view of an exemplary artificial-reality apparatus 100. As shown in FIG. 1, artificial-reality apparatus 100 may include a wearable band 102 dimensioned to be worn around a portion of a user's hand. In this example, artificial-reality apparatus 100 may also include a primary tactile-input location 104 at an outer surface of wearable band 102 and a secondary tactile-input location 106 at the outer surface of wearable band 102. Furthermore, primary tactile-input location 104 and secondary tactile-input location 106 may represent sensors (e.g., touch sensors, range measurement sensors, inertial measurement units, etc.) and/or buttons or switches that activate with a touch by the user and/or a depression of the button or switch. Although illustrated as distinct locations positioned apart from each other on wearable band 102 in FIG. 1, primary tactile-input location 104 and/or secondary tactile-input location 106 may represent any suitable positions on wearable band 102 that may be activated by a tactile input. For example, a user may activate primary tactile-input location 104 and/or secondary tactile-input location 106 by sliding one or more fingers of the user's other hand along wearable band 102.

Figure 2:
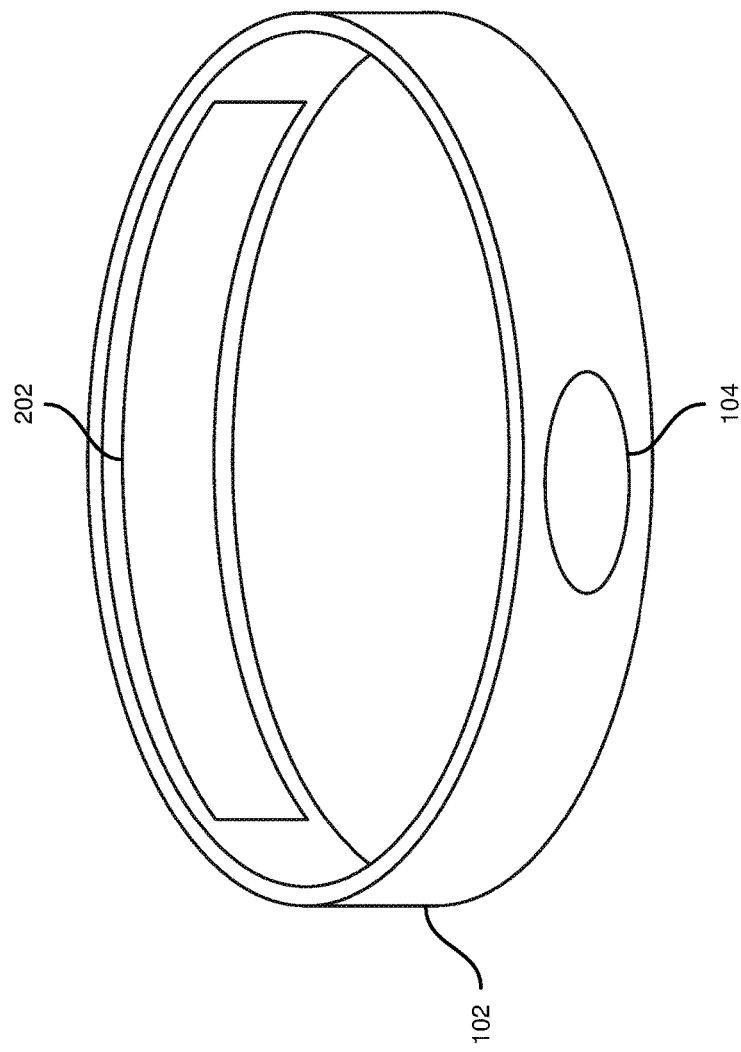
FIG. 2 is an additional perspective view of the exemplary artificial-reality apparatus according to some embodiments.

FIG. 2 illustrates an additional perspective view of artificial-reality apparatus 100. As shown in FIG. 2, artificial-reality apparatus 100 may further include a computing subsystem 202 contained by wearable band 102 that communicatively couples primary tactile-input location 104 and secondary tactile-input location 106 of FIG. 1. Computing subsystem 202 may generally represent any type or form of computing device or system capable of reading computer-executable instructions. For example, computing subsystem 202 may represent a computing component that monitors a state of primary tactile-input location 104 and/or secondary tactile-input location 106 and transmits the state to an output or feedback device.

In some examples, computing subsystem 202 may couple primary tactile-input location 104 and secondary tactile-input location 106 to an artificial-reality system by a wired connection. Additionally or alternatively, computing subsystem 202 may couple primary tactile-input location 104 and secondary tactile-input location 106 to the artificial-reality system by a wireless connection. For example, computing subsystem 202 may couple primary tactile-input location 104 to secondary tactile-input location 106 by a wired connection contained in wearable band 102. In this example, computing subsystem 202 may then couple artificial-reality apparatus 100 to the artificial-reality system by a wireless connection. In additional examples, computing subsystem 202 may represent a separate computing component or device that communicates with artificial-reality apparatus 100.

Figure 3:
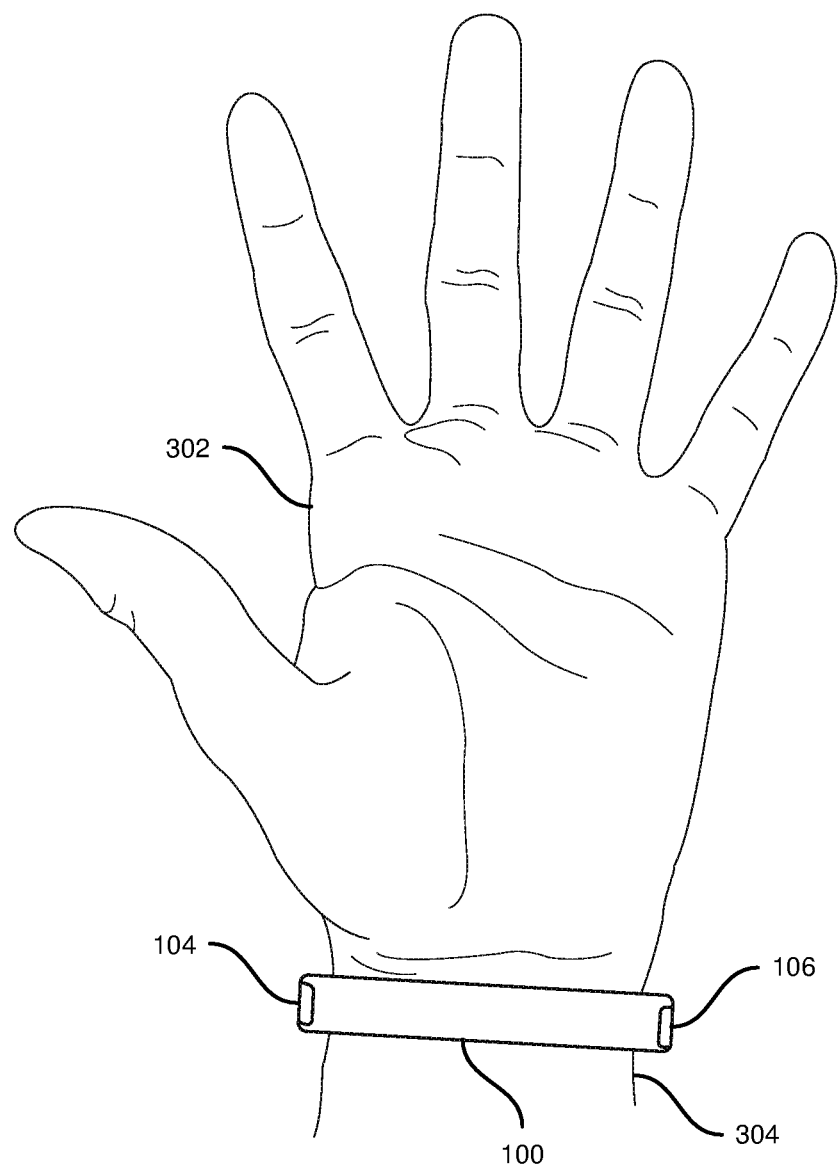
FIG. 3 is a front view of the exemplary artificial-reality apparatus worn on a wrist of a user according to some embodiments.

FIG. 3 illustrates a front view of artificial-reality apparatus 100 worn on a wrist 304 of a user. As shown in FIG. 3, artificial-reality apparatus 100 may be worn around a portion of a hand 302 of the user. In this example, the portion of hand 302 may represent wrist 304, and artificial-reality apparatus 100 may represent a bracelet or wristband dimensioned to fit around wrist 304. Additionally, artificial-reality apparatus 100 may be adjustable and/or flexible to fit securely around wrist 304. In some embodiments, artificial-reality apparatus 100 may additionally or alternatively be sized to be worn around any suitable portion of the user's anatomy (e.g., the user's forearm, elbow region, finger, etc.).

Furthermore, primary tactile-input location 104 and secondary tactile-input location 106 may be disposed around the outer surface of artificial-reality apparatus 100 to be accessible while artificial-reality apparatus 100 is worn by the user. In the example of FIG. 3, primary tactile-input location 104 and secondary tactile-input location 106 may be positioned at opposite sides of wrist 304.

Figure 4:
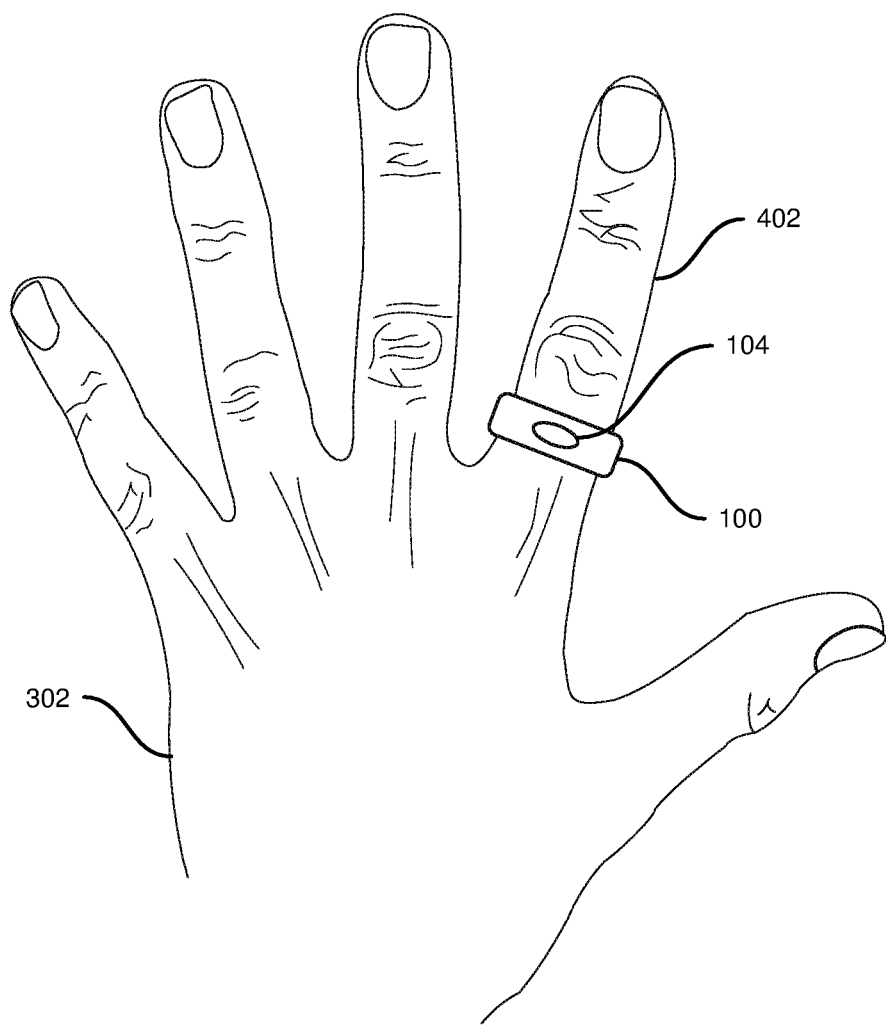
FIG. 4 is a back view of the exemplary artificial-reality apparatus worn on a finger of the user according to some embodiments.

FIG. 4 illustrates a back view of artificial-reality apparatus 100 worn on a finger 402 of the user. As shown in FIG. 4, the portion of hand 302 may represent finger 402. In this example, artificial-reality apparatus 100 may represent a smaller form factor dimensioned to securely fit around finger 402. In this example, primary tactile-input location 104 and secondary tactile-input location 106 may be positioned at a front and a back of finger 402 to be easily accessible.

Figure 5:
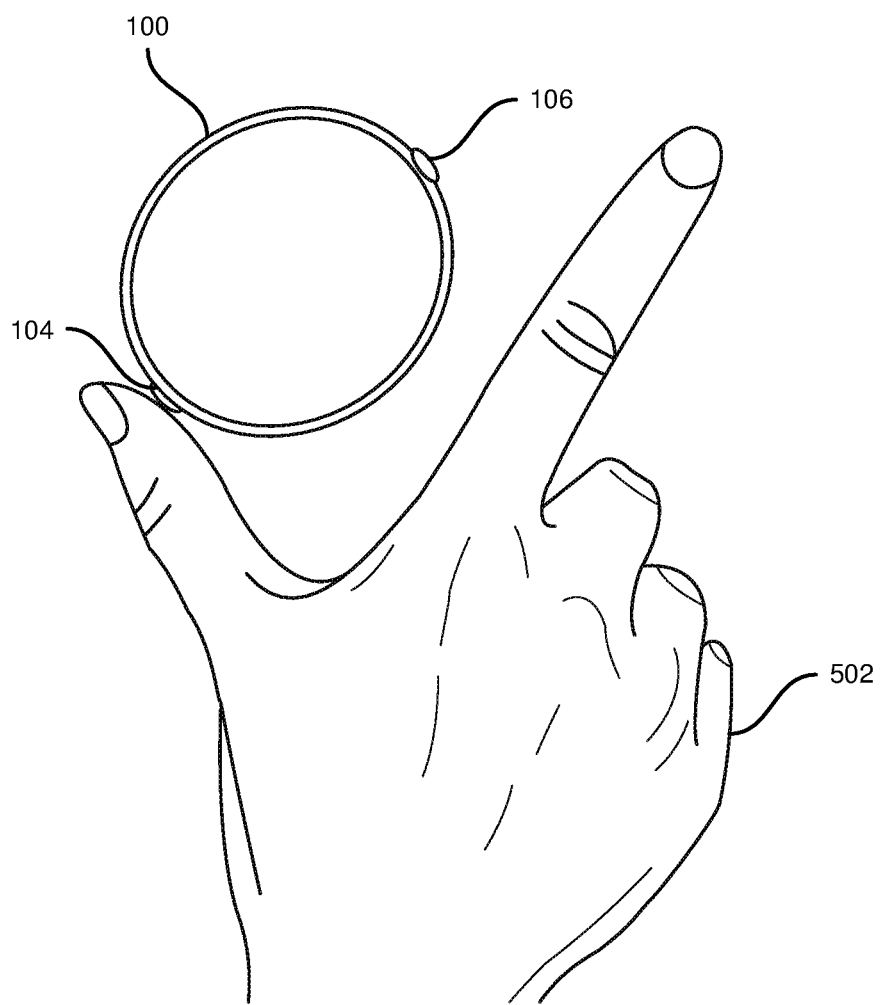
FIG. 5 is a top view of the user activating an exemplary primary tactile-input location according to some embodiments.

FIG. 5 illustrates a top view of the user activating primary tactile-input location 104. As shown in FIG. 5, primary tactile-input location 104 may be activated by another hand 502 of the user. In some embodiments, primary tactile-input location 104 may include a primary tactile sensor activated by a touch from other hand 502. In these embodiments, the primary tactile sensor may detect a light touch from a finger of other hand 502 and/or any physical touch against primary tactile-input location 104. Additionally or alternatively, primary tactile-input location 104 may include a primary tactile switch activated by a depression of the primary tactile switch by other hand 502. In these embodiments, the primary tactile sensor may represent a button or mechanical apparatus that may detect a pressure from other hand 502 to push primary tactile-input location 104.

Figure 6:
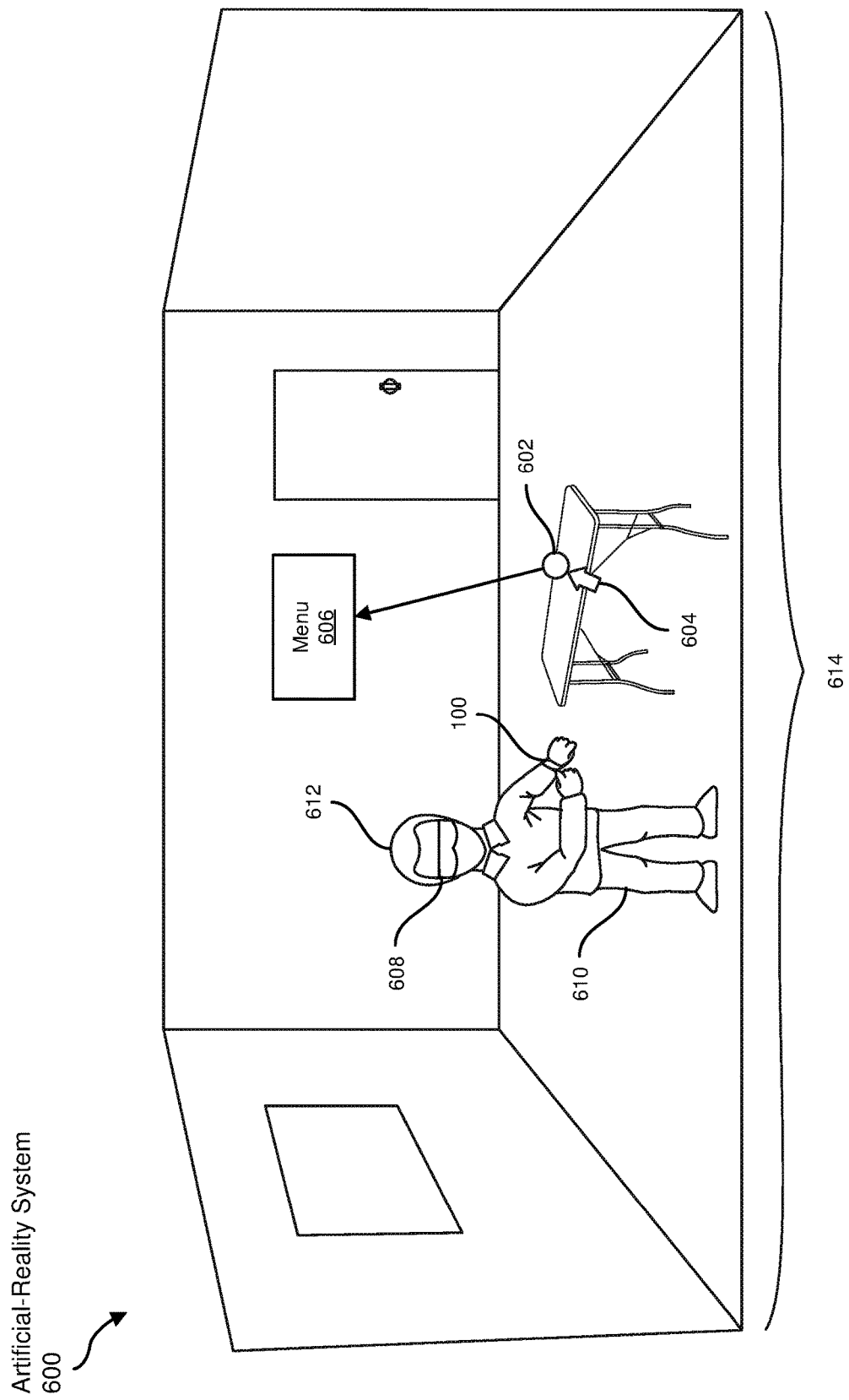
FIG. 6 is a perspective view of the user inspecting an exemplary artificial-reality element within an exemplary artificial-reality environment according to some embodiments.

FIG. 6 illustrates a perspective view of a user 610 inspecting an exemplary artificial-reality element 602 within an exemplary artificial-reality environment 614. As shown in FIG. 6, primary tactile-input location 104 may facilitate inspecting artificial-reality element 602 when other hand 502 of user 610 activates primary tactile-input location 104, as illustrated in FIG. 5. In this example, computing subsystem 202 of FIG. 2 may couple primary tactile-input location 104 of artificial-reality apparatus 100 to an artificial-reality system 600. Furthermore, computing subsystem 202 may couple artificial-reality apparatus 100 to an artificial-reality headset 608 worn on a head 612 of user 610 by a wired connection and/or a wireless connection.

In one example, artificial-reality element 602 may be based on a real-world object (e.g., an inanimate object, a person, etc.). For example, artificial-reality environment 614 may represent an environment that includes real-world elements, such as a table, and artificial-reality element 602 of FIG. 6 may represent an item, such as a physical ball, sitting on the table within a real-world environment. In this example, user 610 may inspect artificial-reality element 602 by inspecting the real-world object (i.e., the ball).

In one embodiment, primary tactile-input location 104 of FIG. 5 may facilitate inspecting artificial-reality element 602, which is visible to user 610 in a display region of artificial-reality headset 608, by manipulating a visible cursor 604 in artificial-reality system 600. Additionally or alternatively, primary tactile-input location 104 may facilitate selecting artificial-reality element 602 in artificial-reality system 600 and/or inspecting a menu 606 positioned about artificial-reality element 602. For example, as illustrated in FIG. 6, user 610 may activate primary tactile-input location 104 of FIG. 5 to activate cursor 604 within artificial-reality environment 614, select artificial-reality element 602 with cursor 604, and double-tap primary tactile-input location 104 to initiate menu 606. In this example, menu 606 may be visible to user 610 in the display region of artificial-reality headset 608 and may include options to inspect various properties of artificial-reality element 602 and/or artificial-reality environment 614.

In some examples, cursor 604 may be positioned within artificial-reality environment 614 based on a position of artificial-reality apparatus 100. Additionally or alternatively, cursor 604 may be positioned based on an eye gaze of user 610 and/or a position of head 612. In these examples, the position of head 612 or the eye gaze may be determined based on a position of artificial-reality headset 608. In some embodiments, one or more sensors within artificial-reality apparatus 100 and/or artificial-reality headset 608 and/or one or more external sensors may detect a location, position, and/or movement of artificial-reality apparatus 100 and/or artificial-reality headset 608 in a local environment (e.g., a mapped local environment).

In some embodiments, artificial-reality system 600 may include artificial-reality headset 608 dimensioned to be worn on head 612 of user 610, wherein artificial-reality headset 608 outputs a feedback about artificial-reality environment 614 to user 610. In addition, artificial-reality system 600 may include artificial-reality apparatus 100 and/or computing subsystem 202 of FIG. 2 that communicatively couples artificial-reality apparatus 100 to artificial-reality headset 608. In these embodiments, artificial-reality headset 608 may output feedback about visual information about artificial-reality environment 614, such as by displaying artificial-reality environment 614 to user 610 in a display region. Additionally or alternatively, artificial-reality headset 608 may output audio information about artificial-reality environment 614 by, for example, playing digital sounds to user 610 via one or more headphones.

Figure 7:
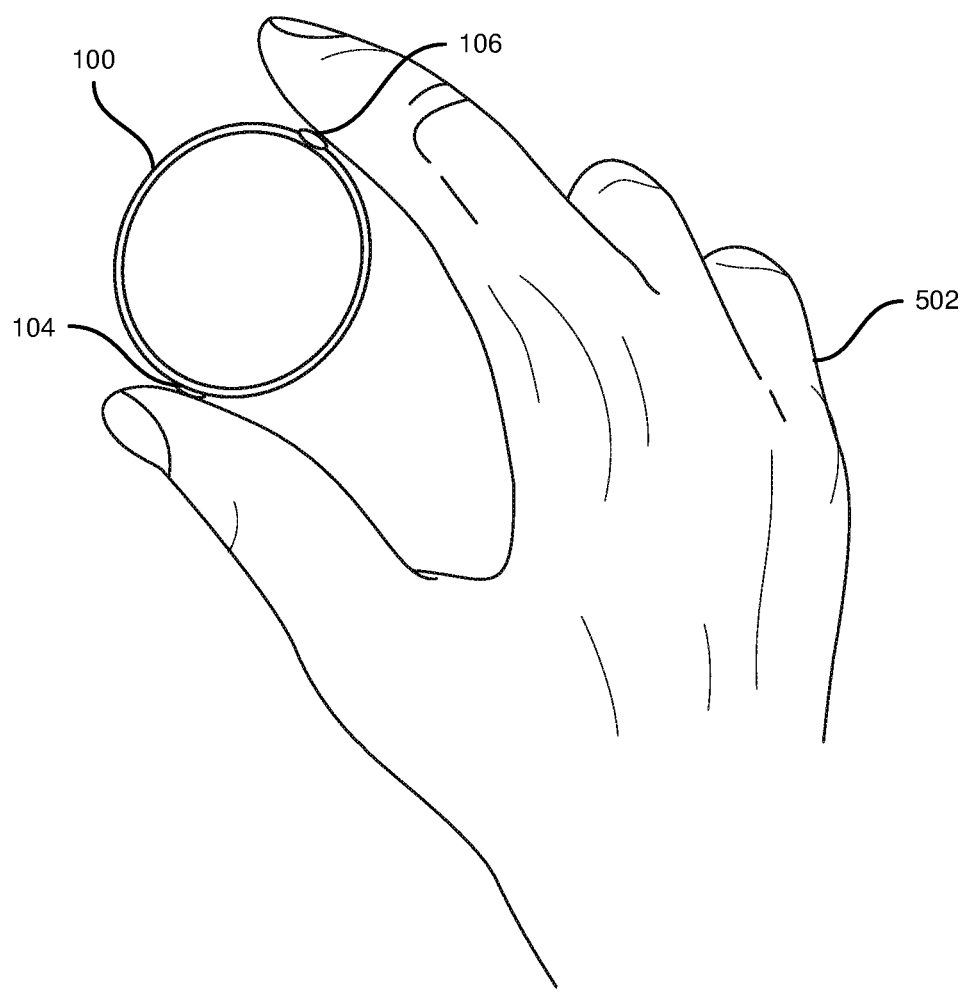
FIG. 7 is a top view of the user activating the exemplary primary tactile-input location and an exemplary secondary tactile-input location according to some embodiments.

FIG. 7 illustrates a top view of other hand 502 of the user simultaneously activating primary tactile-input location 104 and secondary tactile-input location 106. As shown in FIG. 7, other hand 502 may simultaneously activate primary tactile-input location 104 and secondary tactile-input location 106 to facilitate manipulating artificial-reality element 602 of FIG. 6. In one embodiment, secondary tactile-input location 106 may include a secondary tactile sensor activated by a touch from other hand 502 and/or a secondary tactile switch activated by a depression of the secondary tactile switch by other hand 502.

Figure 8:
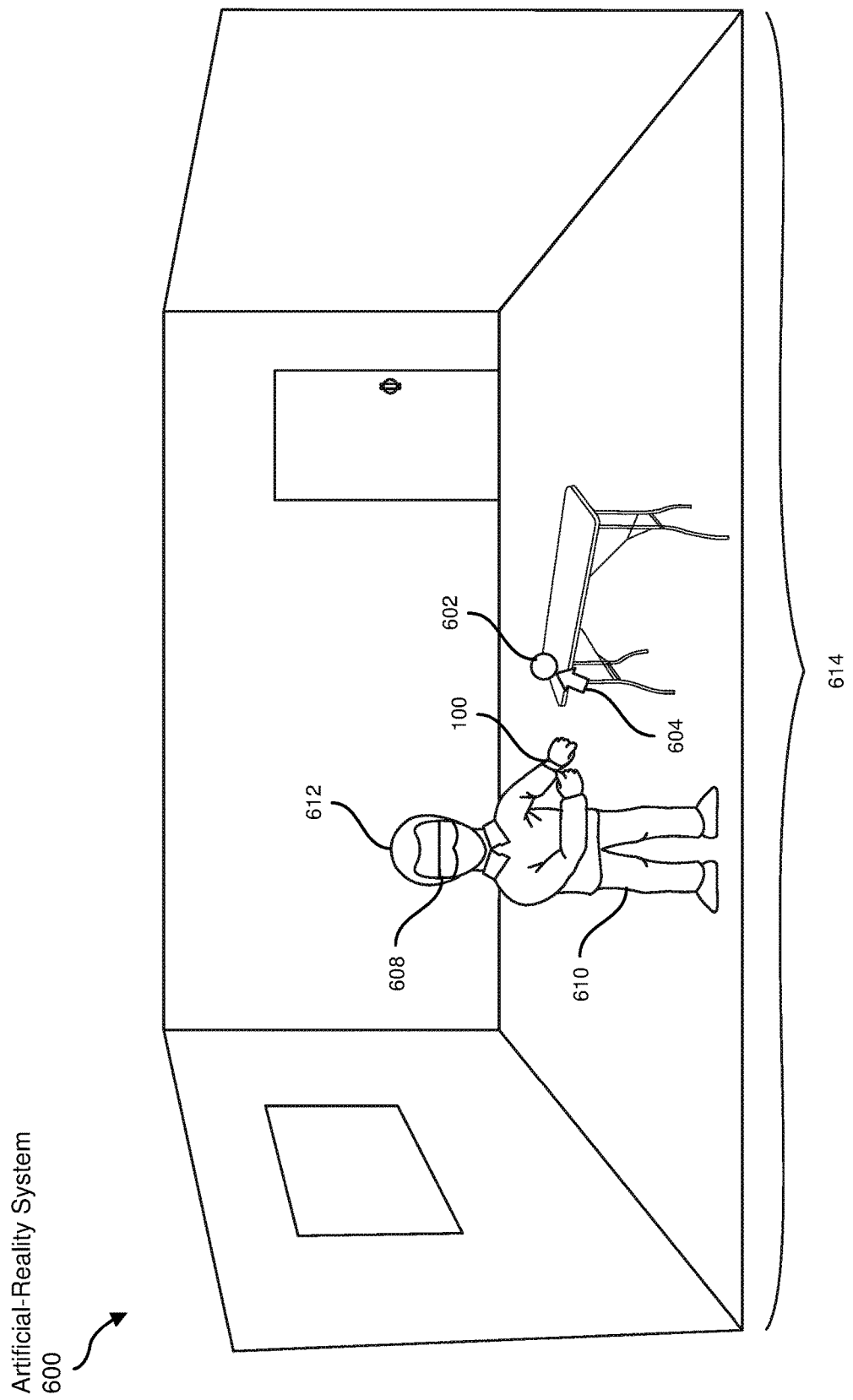
FIG. 8 is a perspective view of the user manipulating the exemplary artificial-reality element within the exemplary artificial-reality environment according to some embodiments.

FIG. 8 illustrates a perspective view of user 610 manipulating artificial-reality element 602 within artificial-reality environment 614. As shown in FIG. 8, user 610 may simultaneously activate primary tactile-input location 104 and secondary tactile-input location 106, as illustrated in FIG. 7, to manipulate artificial-reality element 602. In this example, secondary tactile-input location 106 of artificial-reality apparatus 100 may facilitate manipulating artificial-reality element 602 by selecting artificial-reality element 602 in artificial-reality system 600 and/or inspecting a menu, such as menu 606 of FIG. 6. Additionally or alternatively, artificial-reality apparatus 100 may facilitate moving artificial-reality element 602 within artificial-reality environment 614 and/or adjusting a property of artificial-reality element 602. For example, user 610 may click on artificial-reality element 602 using cursor 604 and, while squeezing both primary tactile-input location 104 and secondary tactile-input location 106 of FIG. 7, hold artificial-reality element 602. Alternatively, in the example of a real-world object, user 610 may hold and/or manipulate the real-world object that corresponds to artificial-reality element 602, which may translate to holding and/or manipulating artificial-reality element 602 within artificial-reality environment 614. As another example, user 610 may select an option from menu 606 of FIG. 6 to change a color, a size, and/or any other suitable property of artificial-reality element 602. Subsequently, artificial-reality headset 608 may display the change to user 610.

In some embodiments, artificial-reality apparatus 100 may facilitate moving artificial-reality element 602 based on a position of artificial-reality apparatus 100, the eye gaze of user 610, and/or the position of head 612 and/or artificial-reality headset 608. For example, user 610 may move hand 302 of FIG. 3 while wearing artificial-reality apparatus 100 and while activating primary tactile-input location 104 and secondary tactile-input location 106. In response, artificial-reality element 602 may move in conjunction with the movement of artificial-reality apparatus 100. In this example, user 610 may then discontinue tactile contact with primary tactile-input location 104 and/or secondary tactile-input location 106 to relinquish a virtual hold on artificial-reality element 602.

Figure 9:
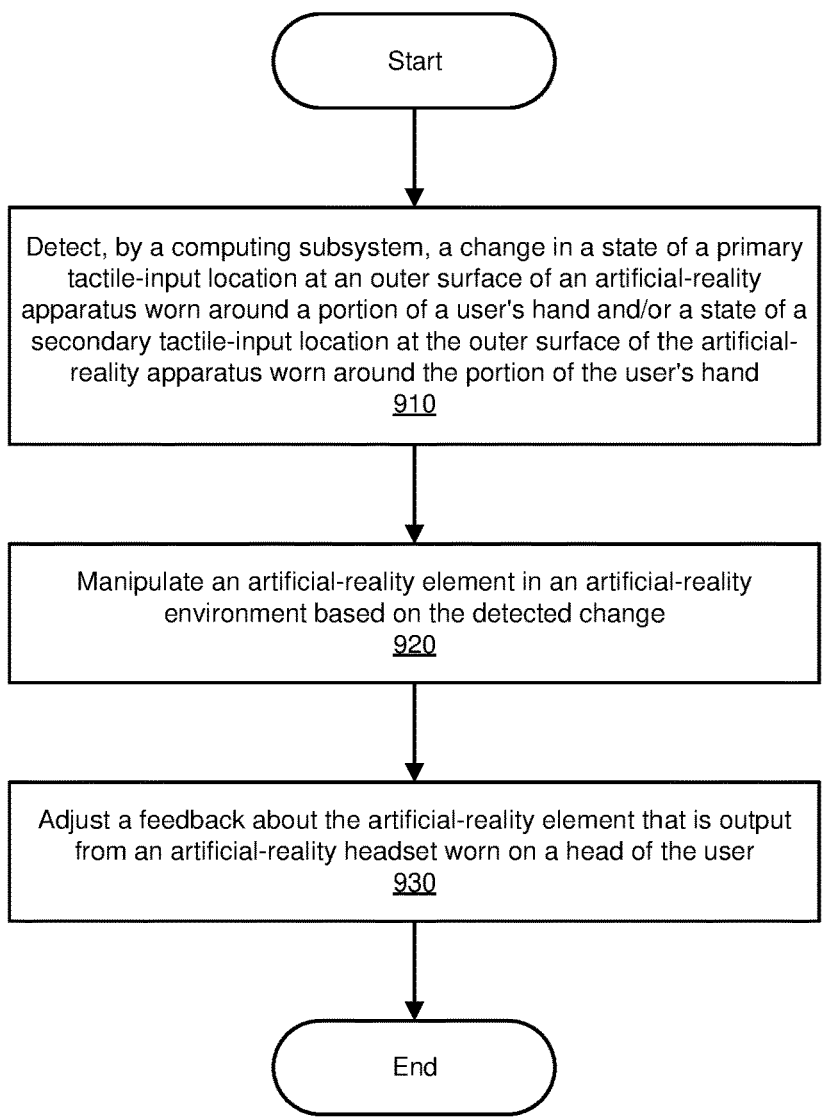
FIG. 9 is a flow diagram of an exemplary method for controlling artificial-reality environments according to some embodiments.

FIG. 9 shows an example method for manufacturing, assembling, using, adjusting, or otherwise configuring or creating the systems and apparatuses presented herein. The steps shown in FIG. 9 may be performed by any individual and/or by any suitable type or form of manual and/or automated apparatus. In particular, FIG. 9 illustrates a flow diagram of an exemplary method 900 for controlling artificial-reality environments.

As shown in FIG. 9, at step 910, one or more of the systems described herein may detect, by a computing subsystem, a change in a state of a primary tactile-input location at an outer surface of an artificial-reality apparatus worn around a portion of a user's hand and/or a state of a secondary tactile-input location at the outer surface of the artificial-reality apparatus worn around the portion of the user's hand. For example, as illustrated in FIG. 7, computing subsystem 202 of FIG. 2 may detect a change in a state of primary tactile-input location 104 and/or a change in a state of secondary tactile-input location 106 of artificial-reality apparatus 100 worn around hand 302 of FIG. 3.

The systems described herein may perform step 910 of FIG. 9 in a variety of ways. In some examples, computing subsystem 202 may be electronically coupled to primary tactile-input location 104 and/or secondary tactile-input location 106 to constantly monitor the state of primary tactile-input location 104 and/or secondary tactile-input location 106. In these examples, computing subsystem 202 may detect when user 610 touches or depresses primary tactile-input location 104 and/or secondary tactile-input location 106.

At step 920, one or more of the systems described herein may manipulate an artificial-reality element in an artificial-reality environment based on the detected change. For example, as illustrated in FIG. 8, artificial-reality system 600 may move artificial-reality element 602 in response to detected changes in the states of primary tactile-input location 104 and secondary tactile-input location 106 of FIG. 7.

The systems described herein may perform step 920 of FIG. 9 in a variety of ways. In one embodiment, manipulating artificial-reality element 602 in artificial-reality environment 614 may include selecting artificial-reality element 602. For example, user 610 may select artificial-reality element 602, such as a photograph of a person, and activate primary tactile-input location 104 and/or secondary tactile-input location 106 to bring up menu 606 of FIG. 6. In further embodiments, manipulating artificial-reality element 602 may include moving artificial-reality element 602 within artificial-reality environment 614 and/or adjusting a property of artificial-reality element 602. For example, user 610 may further select an option from menu 606 to add the person associated with artificial-reality element 602 to a list of friends in a social networking application.

Returning to FIG. 9, at step 930, one or more of the systems described herein may adjust a feedback about the artificial-reality element that is output from an artificial-reality headset worn on a head of the user. For example, as illustrated in FIGS. 6 and 8, a feedback displayed by artificial-reality headset 608 worn by user 610 may be adjusted to display a change in a state of artificial-reality element 602.

The systems described herein may perform step 930 of FIG. 9 in a variety of ways. In one example, adjusting the feedback about artificial-reality element 602 may include presenting information about artificial-reality element 602 based on the state of primary tactile-input location 104. For example, as illustrated in FIG. 6, the feedback may include menu 606 about artificial-reality element 602. Additionally or alternatively, adjusting the feedback may include adjusting visual information and/or audio information about artificial-reality environment 614 based on a change in artificial-reality element 602. As illustrated in FIG. 8, for example, adjusting the feedback may include displaying a new position of artificial-reality element 602 after being moved by user 610.

As discussed throughout the instant disclosure, the disclosed methods, systems, and apparatuses may provide one or more advantages over traditional methods for controlling artificial-reality environments. For example, by dimensioning an artificial-reality apparatus that controls an artificial-reality system to be worn on a user's hand, the disclosed systems may improve the portability and ease of use of the artificial-reality apparatus. Additionally, such a wearable controller may improve over traditional controllers by integrating tactile-input features that respond to the user's touch to manipulate elements in a virtual environment. The disclosed systems may further improve the user's experience by providing responsive feedback to the user in real time, such as by communicating with an artificial-reality headset. Thus, the methods, systems, and apparatuses described herein may improve user interactions with an artificial-reality environment.

As described herein, embodiments of the instant disclosure may, using a wearable apparatus, permit a user to control artificial-reality elements within an artificial-reality environment. For example, a user may activate a button and/or a sensor on the wearable apparatus to examine an object in a virtual-reality environment. Additionally, the wearable apparatus may include a computing subsystem that interfaces with other components of the wearable apparatus and/or with a separate device, such as a virtual-reality headset, to provide feedback about the artificial-reality environment to the user. By adjusting the feedback based on commands to manipulate the artificial-reality environment, the disclosed systems may update changes to the artificial-reality environment in real time as the user controls elements of the environment.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

As detailed above, the computing devices, systems, and/or subsystems described and/or illustrated herein broadly represent any type or form of computing device or system capable of executing computer-readable instructions. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An artificial-reality apparatus comprising:
    a wearable band dimensioned to be worn around a portion of a user's first hand;
    a primary tactile-input location at an outer surface of the wearable band to facilitate inspecting a state of an artificial-reality element when a second hand of the user activates the primary tactile-input location;
    a secondary tactile-input location at the outer surface of the wearable band to facilitate changing the state of the artificial-reality element when the user's second hand simultaneously squeezes both the primary tactile-input location and the secondary tactile-input location, wherein changing the state of the artificial-reality element comprises moving the artificial-reality element within an artificial-reality environment; and
    a computing subsystem contained by the wearable band that communicatively couples the primary tactile-input location and the secondary tactile-input location to an artificial-reality system.

2. The artificial-reality apparatus of claim 1, wherein the wearable band is dimensioned to be worn around at least one of:
    a wrist of the user's first hand; or
    a finger of the user's first hand.

3. The artificial-reality apparatus of claim 1, wherein the primary tactile-input location comprises at least one of:
    a primary tactile sensor activated by a touch from the user's second hand; or
    a primary tactile switch activated by a depression of the primary tactile switch by the user's second hand.

4. The artificial-reality apparatus of claim 1, wherein the primary tactile-input location facilitates inspecting the state of the artificial-reality element by at least one of:
    manipulating a cursor in the artificial-reality system;
    selecting the artificial-reality element in the artificial-reality system; or
    inspecting a menu about the artificial-reality element.

5. The artificial-reality apparatus of claim 4, wherein the cursor in the artificial-reality system is positioned based on at least one of:
    a position of the wearable band;
    an eye gaze of the user; or
    a position of a head of the user.

6. The artificial-reality apparatus of claim 1, wherein the secondary tactile-input location comprises at least one of:
    a secondary tactile sensor activated by a touch from the user's second hand; or
    a secondary tactile switch activated by a depression of the secondary tactile switch by the user's second hand.

7. The artificial-reality apparatus of claim 1, wherein the secondary tactile-input location facilitates changing the state of the artificial-reality element by at least one of:
    selecting the artificial-reality element in the artificial-reality system;
    inspecting a menu about the artificial-reality element; or
    adjusting a property of the artificial-reality element.

8. The artificial-reality apparatus of claim 1, wherein the secondary tactile-input location facilitates moving the artificial-reality element based on at least one of:
    a position of the wearable band;
    an eye gaze of the user; or
    a position of a head of the user.

9. The artificial-reality apparatus of claim 1, wherein the computing subsystem couples the primary tactile-input location and the secondary tactile-input location to the artificial-reality system by at least one of:
    a wired connection; or
    a wireless connection.

10. An artificial-reality system comprising:
    an artificial-reality headset dimensioned to be worn on a user's head, wherein the artificial-reality headset outputs a feedback about an artificial-reality environment to the user;
    an artificial-reality apparatus dimensioned to be worn around a portion of a first hand of the user, the artificial-reality apparatus comprising:
        a primary tactile-input location at an outer surface of the artificial-reality apparatus to facilitate inspecting a state of an artificial-reality element when a second hand of the user activates the primary tactile-input location; and
        a secondary tactile-input location at the outer surface of the artificial-reality apparatus to facilitate changing the state of the artificial-reality element when the user's second hand simultaneously squeezes both the primary tactile-input location and the secondary tactile-input location, wherein changing the state of the artificial-reality element comprises moving the artificial-reality element within the artificial-reality environment; and
    a computing subsystem that communicatively couples the artificial-reality apparatus to the artificial-reality headset.

11. The artificial-reality system of claim 10, wherein the artificial-reality headset outputs a feedback about at least one of:
    visual information about the artificial-reality environment; or
    audio information about the artificial-reality environment.

12. The artificial-reality system of claim 10, wherein the artificial-reality apparatus is dimensioned to be worn around at least one of:
    a wrist of the user's first hand; or
    a finger of the user's first hand.

13. The artificial-reality system of claim 10, wherein the primary tactile-input location facilitates inspecting the state of the artificial-reality element by at least one of:
- manipulating a cursor in the artificial-reality environment;
- selecting the artificial-reality element in the artificial-reality environment; or
- inspecting a menu about the artificial-reality element.

14. The artificial-reality system of claim 13, wherein the cursor in the artificial-reality environment is positioned based on at least one of:
- a position of the artificial-reality apparatus;
- an eye gaze of the user; or
- a position of the artificial-reality headset.

15. The artificial-reality system of claim 10, wherein the secondary tactile-input location facilitates changing the state of the artificial-reality element by at least one of:
- selecting the artificial-reality element in the artificial-reality environment;
- inspecting a menu about the artificial-reality element; or
- adjusting a property of the artificial-reality element.

16. The artificial-reality system of claim 10, wherein the secondary tactile-input location facilitates moving the artificial-reality element based on at least one of:
- a position of the artificial-reality apparatus;
- an eye gaze of the user; or
- a position of the artificial-reality headset.

17. The artificial-reality system of claim 10, wherein the computing subsystem couples the artificial-reality apparatus to the artificial-reality headset by at least one of:
- a wired connection; or
- a wireless connection.

18. A method comprising: detecting, by a computing subsystem, a change in at least one of: a state of a primary tactile-input location at an outer surface of an artificial-reality apparatus worn around a portion of a user's hand that is dimensioned to facilitate inspecting a state of an artificial-reality element; and a state of a secondary tactile-input location at the outer surface of the artificial-reality apparatus worn around the portion of the user's hand that is dimensioned to facilitate changing the state of the artificial-reality element in conjunction with the primary tactile-input location when the user simultaneously squeezes both the primary tactile-input location and the secondary tactile-input location, wherein changing the state of the artificial-reality element comprises moving the artificial-reality element within an artificial-reality environment; manipulating the artificial-reality element in the artificial-reality environment based on the detected change; and adjusting a feedback about the artificial-reality element that is output from an artificial-reality headset worn on a head of the user.

19. The method of claim 18, wherein manipulating the artificial-reality element in the artificial-reality environment comprises at least one of:
- selecting the artificial-reality element in the artificial-reality environment; or
- adjusting a property of the artificial-reality element.

20. The method of claim 18, wherein adjusting the feedback about the artificial-reality element comprises at least one of:
- presenting information about the artificial-reality element based on the state of the primary tactile-input location;
- adjusting visual information about the artificial-reality environment based on a change in the artificial-reality element; or
- adjusting audio information about the artificial-reality environment based on a change in the artificial-reality element.

* * * * *